Dec. 17, 1935.  A. R. PRIBIL  2,024,183
METHOD OF MAKING CHAIN LINKS
Filed March 28, 1935
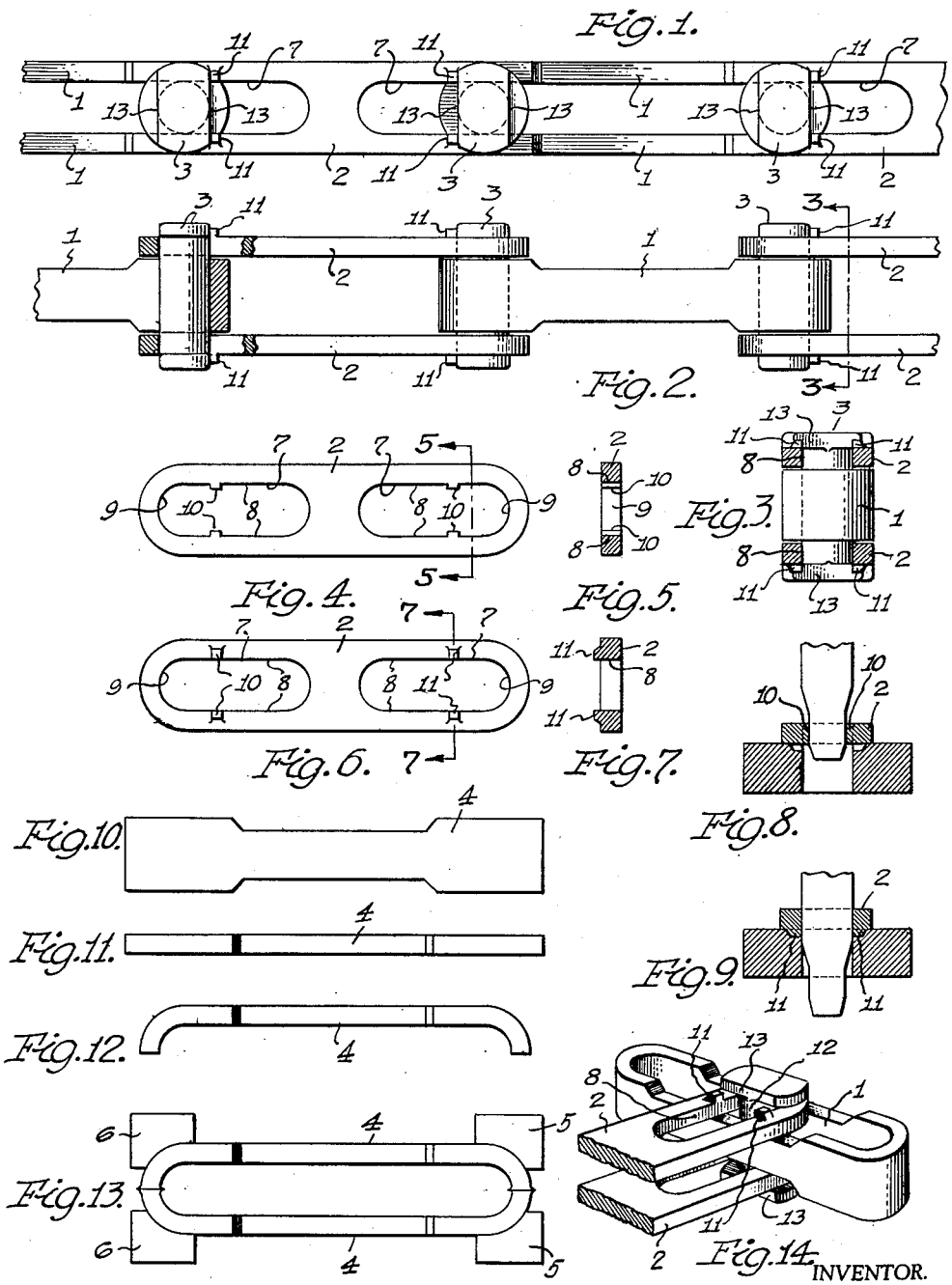
INVENTOR.
Alexis R. Pribil,
BY
ATTORNEYS Patented Dec. 17, 1935

2,024,183

UNITED STATES PATENT OFFICE 2,024,183

METHOD OF MAKING CHAIN LINKS

Alexis R. Pribil, Saginaw, Mich.

Application March 28, 1935, Serial No. 13,423

3 Claims. (Cl. 59—8)

This invention relates to chains of the type particularly adapted for use in chain conveyors and has for its object to provide a structure of greater inherent strength, of greater uniformity both in size and strength, and which can be made at less cost than conventional chains of this type.

More specifically it is the object to teach the manufacture of chain links from rolled sheet metal with retainer lugs cold formed integral therewith, and to so form these lugs that the cylindrical end will be held in its proper operative position.

Another object is to teach the manufacture of the links, intended to mate with the links above described, also out of sheet metal as strip steel, in such manner that they will have improved strength and in order that they may be manufactured in production with greater facility.

Other objects and advantages will become hereinafter more fully apparent as reference is had to the accompanying drawing, wherein my invention is illustrated and in which—

Figure 1 is a plan view of my improved chain;

Fig. 2 is a side view of the chain taken normal to Fig. 1;

Fig. 3 is a section taken along the line 3—3 of Fig. 2;

Fig. 4 is an elevation of the blank for one link member;

Fig. 5 is a section taken along the line 5—5 of Fig. 4;

Fig. 6 is a plan view of the link of Fig. 4 after cold forming;

Fig. 7 is a section taken along the line 7—7 of Fig. 6;

Fig. 8 is a section through a link in place over a forming die;

Fig. 9 is a view similar to Fig. 1 showing the cold forming operation completed;

Figs. 10 and 11 are elevations of a blank for the mating link, taken normal to each other;

Fig. 12 shows the blank of Figs. 10 and 11 ready for welding;

Fig. 13 shows two blanks of the type of Fig. 12 in a welding machine with the welding completed;

Fig. 14 is a perspective view showing the position of the links when assembling or disassembling.

1 indicates a link and 2 the link members which are held in operative engagement by means of bolts 3. The links are both made from sheet metal as will now be described.

Each link 1 is made from two flat blanks 4 of generally rectangular shape with the ends parallel and the sidewalls reduced for a substantial distance in a direction transverse to the wall thickness. These blanks are curved or rounded at each end into a quarter circle and are then clamped between welding terminals 5, 6 with their end edges in pressure abutment. The terminals 5 and 6 are then energized and the two halves are welded together, the weld being at the center of curvature of each end and hence symmetrical with intended lengthwise loading.

The link members 2 are all identical in shape. They are made from sheet metal by cutting a blank as shown in Fig. 4 with the end portions being punched to form two elongated slots 7. The side walls 8 and one end wall 9 of each slot are parallel with the outer edges of the link so that the wall thickness of each slot is uniform. Projecting inwardly from opposite sides of each slot are the ears 10. This blank is then cold formed as shown in Figs. 9 and 8 so that the metal of the ears 10 is extruded into projections 11 which consequently have their inner sides coplanar with the adjacent walls of the slots.

A dual ended bolt 12 having a cylindrical body portion of a diameter slightly less than the width of the slot 7 is provided with heads flattened at 13 so that the pitch of the chain will remain uniform regardless of slack in the chain. The body of the bolt has wearing contact with a weld of the link 1.

What I claim is:

1. The method of making half links for chains which consists in cutting from strip steel an elongated strip having parallel side walls, in punching in each end of said strip elongated slots having ears projecting inwardly of said slots intermediate the ends thereof, and in cold forming said ears to extrude them outwardly of the plane of said slots to form retaining lugs for end bolts.

2. The method of making half links for chains which consists in cutting from sheet metal an elongated strip having parallel side walls and rounded ends, in punching at each longitudinal side of the center of said strip an elongated slot having rounded ends concentric with the rounded ends of the strip, said slots being formed so that two ears project inwardly from intermediate portions of the side walls thereof, and in cold forming said ears to extrude them whereby the side walls of said slots parallel the side walls of said strip.

3. The method of making half links for chains which consists in cutting from sheet metal an elongated strip having rounded ends and parallel side walls, in punching said strip to form an elongated slot at each end with opposed ears extending inwardly thereof and with the remainder of the interior surface thereof parallel to the outer edges or side walls of said strip, in then cold forming said ears to a shape such that the entire surface of said slots parallels the outer surface or side walls of said link, said ears being thus extruded from an otherwise flat surface of said strip to constitute retaining means for end bolts.

ALEXIS R. PRIBIL.